US012607599B2

(12) United States Patent
Sandoghdar et al.

(10) Patent No.: US 12,607,599 B2
(45) Date of Patent: Apr. 21, 2026

(54) METHOD AND APPARATUS FOR DETECTING PARTICLES, LIKE BIOLOGICAL MACROMOLECULES OR NANOPARTICLES

(71) Applicant: Max-Planck-Gesellschaft zur Foerderung der Wissenschaften e. V., Munich (DE)

(72) Inventors: Vahid Sandoghdar, Bamberg (DE); Marek Piliarik, Libeznice (CZ); Katharina Koenig, Nuremberg (DE)

(73) Assignee: Max-Planck-Gesellschaft zuf Foerderung der Wissenschaften e. V., Munich (DE)

( * ) Notice: Subject to any disclaimer, the term of this patent is extended or adjusted under 35 U.S.C. 154(b) by 268 days.

(21) Appl. No.: 17/852,933

(22) Filed: Jun. 29, 2022

(65) Prior Publication Data

US 2022/0341872 A1 Oct. 27, 2022

Related U.S. Application Data

(62) Division of application No. 15/757,226, filed as application No. PCT/EP2015/001804 on Sep. 7, 2015, now Pat. No. 11,397,163.

(51) Int. Cl.
*G01N 27/447* (2006.01)
*G01N 15/14* (2024.01)
(Continued)

(52) U.S. Cl.
CPC ... *G01N 27/44721* (2013.01); *G01N 15/1434* (2013.01); *G01N 15/1459* (2013.01);
(Continued)

(58) Field of Classification Search
CPC ....... G01N 2021/7779; G01N 15/1434; G01N 15/1459; G01N 15/1484;
(Continued)

(56) References Cited

U.S. PATENT DOCUMENTS 7,074,311 B1 7/2006 Cunningham
2002/0189945 A1* 12/2002 Ruggiero ............. G01N 21/171
204/601
(Continued)

FOREIGN PATENT DOCUMENTS

EP 1757926 A1 2/2007
JP 2007533971 A 11/2007
(Continued)

OTHER PUBLICATIONS

W. Faubel, B. S. Seidel, and H. J. Ache, Trace analysis of water pollutants by photothermal phase shift spectroscopy with an integrated optical microinterferometer, Opt. Eng. 35(12) 3555-3561 (Dec. 1996) (Year: 1996).*
(Continued)

*Primary Examiner* — Dean Kwak
(74) *Attorney, Agent, or Firm* — Caesar Rivise, PC

(57) ABSTRACT

A method of detecting particles, e. g. proteins, after separation of particles based on their specific features, e.g. charge, size, shape, density, as series of single light scattering events created by the individual particles is described. The particles are separated from each other along the separation path and particles have specific arrival times at the target side depending on the particle features. The detecting step comprises an interferometric sensing of the light scattered at individual particles bound or transient in the detection volume. Parameters of the scattering light signals e.g. the interferometric contrast are analyzed for obtaining specific particle features, e.g. size, mass, shape, charge, or
(Continued)

affinity of the particles. Furthermore, a detection apparatus being configured for detecting particles is described.

19 Claims, 4 Drawing Sheets

(51) Int. Cl.

| | |
|---|---|
| *G01N 15/1434* | (2024.01) |
| *G01N 21/45* | (2006.01) |
| *G01N 21/53* | (2006.01) |
| *G01N 30/60* | (2006.01) |
| *G01N 30/74* | (2006.01) |
| *G02B 21/14* | (2006.01) |
| *G01N 15/00* | (2006.01) |
| *G01N 30/88* | (2006.01) |

(52) U.S. Cl.
CPC ......... *G01N 15/1484* (2013.01); *G01N 21/45* (2013.01); *G01N 21/53* (2013.01); *G01N 27/44791* (2013.01); *G01N 27/44795* (2013.01); *G01N 30/6095* (2013.01); *G01N 30/74* (2013.01); *G02B 21/14* (2013.01); *G01N 2015/0038* (2013.01); *G01N 2015/145* (2013.01); *G01N 2015/1493* (2013.01); *G01N 2030/8813* (2013.01)

(58) Field of Classification Search
CPC ..... G01N 2015/0038; G01N 2015/145; G01N 2015/1493; G01N 2030/8813; G01N 21/35; G01N 21/3586; G01N 21/45; G01N 21/53; G01N 27/44721; G01N 27/44791; G01N 27/44795; G01N 30/6095; G01N 30/74; G01B 11/161; G01J 3/45; G01J 2003/451; G01M 11/0271; G03F 9/7049; G03F 7/70408; G02B 21/14
USPC .................. 436/149, 180, 516; 422/500, 527
See application file for complete search history.

(56) References Cited

U.S. PATENT DOCUMENTS

| | | | |
|---|---|---|---|
| 2006/0223164 A1 | 10/2006 | Orwar et al. | |
| 2009/0257057 A1* | 10/2009 | Novotny ................ | B82Y 35/00 977/773 |

FOREIGN PATENT DOCUMENTS

| | | |
|---|---|---|
| JP | 2013238463 A | 11/2013 |
| WO | 2004039499 A2 | 5/2004 |
| WO | 2005033283 A2 | 4/2005 |
| WO | 2012081284 A1 | 6/2012 |
| WO | 2015130874 A1 | 9/2015 |

OTHER PUBLICATIONS

Bossi et al. (2000). Capillary electrophoresis coupled to biosensor detection. Journal of Chromatography A, 892(1-2), 143-153.
Castro et al. (1995). Single-molecule electrophoresis. Analytical Chemistry, 67(18), 3181-3186.
Celebrano et al. (2011). Single-molecule imaging by optical absorption. Nature Photonics, 5(2), 95:1-4.
Chen et al. (2005). Amperometric biosensor coupled to capillary electrophoresis for glucose determination. Microchimica Acta, 150(3-4), 239-245.
Hughes et al. (2012). Microfluidic western blotting. Proceedings of the National Academy of Sciences, 109(52), 21450-21455.
Hughes et al. (2014). Single-cell western blotting. Nature methods, 11(7), 749-755.
Ignatovich et al. (2006). Optical detection of single nanoparticles and viruses. IEEE Journal of selected topics in quantum electronics, 12(6), 1292-1300.
Ignatovich et al. (2006). Real-time and background-free detection of nanoscale particles. Physical review letters, 96(1), 013901: 1-4.
Jacobsen et al. (2006). Interferometric optical detection and tracking of very small gold nanoparticles at a water-glass interface. Optics express, 14(1), 405-414.
Kukura et al. (2008). Imaging a single quantum dot when it is dark. Nano letters, 9(3), 926-929.
Lindfors et al. (2004). Detection and spectroscopy of gold nanoparticles using supercontinuum white light confocal microscopy. Physical review letters, 93(3), 037401:1-4.
Mitra et al. (2010). Nano-optofluidic detection of single viruses and nanoparticles. ACS nano, 4(3), 1305-1312.
Mitra et al. (2012). Real-time optical detection of single human and bacterial viruses based on dark-field interferometry. Biosensors and Bioelectronics, 31(1), 499-504.
Ortega-Arroyo et al. (2012). Interferometric scattering microscopy (ISCAT): new frontiers in ultrafast and ultrasensitive optical microscopy. Physical Chemistry Chemical Physics, 14(45), 15625-15636.
Piliarik et al. (2014). Direct optical sensing of single unlabelled proteins and super-resolution imaging of their binding sites. Nature communications, 5, 4495:1-8.
Wang et al. (2003). Attomole sensitivity for unlabeled proteins and polypeptides with on-chip capillary electrophoresis and universal detection by interferometric backscatter. Electrophoresis, 24, 865-873.
International Search Report from corresponding PCT/EP2015/001804 dated May 10, 2016.
English abstract of WO2012081284.

* cited by examiner

METHOD AND APPARATUS FOR DETECTING PARTICLES, LIKE BIOLOGICAL MACROMOLECULES OR NANOPARTICLES

CROSS-REFERENCE TO RELATED APPLICATIONS

This divisional application claims the benefit under 35 U.S.C. § 121 of U.S. application Ser. No. 15/757,226 Mar. 2, 2018 entitled METHOD AND APPARATUS FOR DETECTING PARTICLES, LIKE BIOLOGICAL MAC-ROMOLECULES OR NANOPARTICLES, which claims the benefit under 35 U.S.C. § 371 of PCT/EP2015/001804, filed Sep. 7, 2015 and whose entire disclosures is incorporated by reference herein.

FIELD OF THE INVENTION

The present invention relates to a method of detecting particles, e.g. biological macromolecules, like proteins, carbohydrates, or nucleic acids molecules, obtained from a sample by a separation process. Furthermore, the present invention relates to a detection apparatus for detecting particles, including a separation device and a detection device. Applications of the invention are available in the fields of analysing samples, e.g. in chemistry, material science, biology, or medicine.

TECHNICAL BACKGROUND OF THE INVENTION

In the present specification, reference is made to the following publications cited for illustrating prior art techniques, in particular with regard to prior art separation and detection techniques:

[1] Z. Wang et al. in "Electrophoresis" vol. 24, 2003, p. 865;
[2] A. J. Hughes et al. in "PNAS" vol. 109, 2012, p. 21450;
[3] A. J. Hughes et al. in "Nature Methods" vol. 11, 2014, p. 749;
[4] A. Castro et al. in "Anal. Chem." vol. 67, 1995, p. 3181;
[5] A. Bossi et al. in "Journal of Chromatography A" vol. 892, 2000, p. 143;
[6] G. Chen et al. in "Microchim Acta" vol. 150, 2005, p. 239;
[7] U.S. Pat. No. 7,074,311;
[8] K. Lindfors et al. in "PRL" vol. 93, 2004, p. 037401;
[9] P. Kukura et al. in "Nano Letters" vol. 9, 2009, p. 926;
[10] M. Celebrano et al. in "Nature Photonics" vol. 5, 2011, p. 95;
[11] M. Piliarik et al. in "Nature Communications" vol. 5, 2014, p. 4495; and
[12] V. Jacobsen et al. in "Optics Express" vol. 14, 2006, p. 405.

Analysis of complex samples comprising a large number of macromolecular species by separating and detecting methods is a general challenge in biological research. Electrophoresis or liquid chromatography separating macromolecules from mixtures by application of an electric field or a separation flow, resp., are utilized to sort and identify biomolecules. With electrophoresis, the macromolecules are placed at one end of a separating medium and subjected to an electrical current. Different macromolecules in the mixture will migrate at different speeds, depending on the nature of the separating medium and the characteristics of the macromolecules. Electrophoretic or liquid chromatography techniques can be applied to the separation of any macromolecule, including e.g. nucleic acids, proteins, peptides, and carbohydrates, for sorting based on e.g. size, mass, shape, charge, and/or affinity and subsequent identification of individual bands.

Conventional electrophoretic techniques comprise e.g. poly-acrylamide slab gel electrophoresis (PAGE) or capillary electrophoresis. With the PAGE method, molecules are spatially separated within a gel layer and detected e.g. via UV absorption measurement, direct observation of stained molecules in visible light, or specific blotting of selected biomolecular species using fluorescently labeled antibodies in e.g. western blot. The sensitivity of electrophoresis readout is limited (i) by the staining or blotting efficiency and (ii) by the sensitivity of the stain imaging. In conventional methods, the total mass of the molecules required to read out a single band lies in the nanograms range. This amount corresponds to billions of molecules needed to reside within a single band of the electropherogram. Accordingly, as a general disadvantage, the conventional methods often require a sample preparation for concentrating the molecules to be detected.

Capillary electrophoresis is an alternative to slab gel electrophoresis allowing for higher electric potential applied to the separating matrix and therefore shorter separation times. The separating medium is a capillary of an inner diameter ranging between several μm and 100 μm, which is filled with gel or buffer, or a microfluidic channel. Capillary electrophoresis uses e.g. an inline readout which detects the transition of bands of molecules through a fixed position at the capillary by measuring the UV absorbance or fluorescence of the molecules. The sensitivity of the UV absorbance measurement is limited by the absorption cross section of a single protein. Again, high concentrations, typically in the micromolar range, are required within each band. In a conventional configuration this corresponds to a detection limit in the femtomol range ($1$ fmol corresponds to $6 \times 10^8$ molecules within the detected band). The microfluidic-based electrophoresis allows for pushing the sensitivity towards 100 amol levels ([1]) or, by combining with fluorescence immunoblotting, to the order of $10^4$ molecules ([2]). The best sensitivities achieved using microfluidics western blotting allow resolving ensembles as small as few thousands of molecules ([3]). To date the only way of observing single molecule diffusion in the electrophoretic gel is via fluorescence ([4]). However, molecular labels alter the behaviour, charge, size and other properties of investigated protein molecules, which limits the western blot with single molecule sensitivity to native fluorescent molecules only.

The combination of gel or capillary electrophoresis as well as other chromatography methods (e.g. liquid chromatography) with a detection method based on electrochemical, quartz crystal, or optical biosensor has been previously reported ([5], [6], [7]). This combination provides improved detection automation, real-time electronic readout, usability and reproducibility as well as higher sensitivity comparing to conventional capillary electrophoresis readout based on the UV absorption.

In current biochemistry and medicine, there is a need for determination of extremely small quantities of proteins in physiological samples, for investigations in areas like "single-cell omics," and CTC (Circulating tumor cells), where protein profiles in picoliter amounts of samples have to be detected even when they are present at extremely low levels. Total amount of biomolecular material present in such samples (e.g. $10^{-20}$ mol) is often far below the sensitivity of conventional separation methods (e.g. $10^{-12}$ mol). However, to date there is no technology which would offer significantly improved electrophoresis readout sensitivity to the level of a few or a single macromolecule.

Detecting single unlabeled particles has been demonstrated using a technique called interferometric scattering detection (iSCAT), as described for imaging and spectroscopy of nanoparticles ([8], [12]), quantum dots ([9]), dye molecules ([10]), and single unlabeled proteins ([11]).

The iSCAT technique is based on the following considerations. Scattering is the most fundamental process in light-matter interaction, and any object of finite size has a finite scattering cross section for electromagnetic radiation. An extinction measurement of scattering sources is obtained from an interference of the light scattered by the scattering source, e.g. protein molecule, with an incident or reflected beam. The variation of the transmission or reflection intensity reports on the presence of an object. Corresponding to the object size, the interference signal may be extremely low, and the detectability of this small signal only depends on the signal-to-noise ratio (SNR).

If a light beam illuminates the surface of a glass substrate, it experiences partial reflection at the substrate interface as well as scattering by particles, like nanoparticles or molecules, adsorbed on the substrate. The signal of interest is given by the part of the light intensity $I_{int}$ $I_{int}=2|E_{ref}||E_{sca}|\cos\phi$ that corresponds to the beating of the reflected light field with the scattered light field. Here $E_{ref}$ and $E_{sca}$ denote the electric fields of the reflected and scattered components, respectively, and $\phi$ is the phase shift acquired during the scattering or propagation processes. A scattering object on the substrate incurs a change in the scattered light field of $\Delta E_{sca}$ resulting in a proportional change in the interference signal $\Delta I_{int}$. For shot-noise-limited detection the SNR of $\Delta I_{int}$ can, hence, be approximated as $SNR\sim(\Delta N_{sca})0.5$, where $\Delta N_{sca}$ denotes the change in the number of scattered photons that interfere on the detector. In practice, however, several other sources of noise and systematic effects are considered.

A single-protein detection setup is described in [11], comprising a homodyne interferometer 20' with a light source 21', imaging optics 22', 24', a beam splitter 23' and a sensor device 25' as shown in FIG. 7. A plane-wave laser beam from the light source 21' illuminates a water-filled detection volume 30' restricted by a surface 31' of a glass substrate. The partial reflection of this beam at the substrate-water interface (surface 31') is used as the reference for the homodyne detection. Protein molecules 1' adsorbed on the surface 31' or passing through the detection volume 30' in close vicinity of the surface 31' as well as the surface roughness generate scattered radiation, which is collected by the high-NA oil immersion microscope objective 22' of the imaging optics. The reference and scattered light are imaged via an imaging lens 24' on the sensor device 25' (e.g. CMOS camera) in such a way, that the reference beam approaches the sensor device 25' as a plane wave while the scattered light of a molecule is a converging spherical wave. These two optical fields are coherent and thus they can interfere giving rise to the interference signal $\Delta I_{int}$.

Because the background associated with the surface roughness is static, the desired signal representing the particle (change in the interference signal $\Delta I_{int}$) can be extracted from differential (or: incremental) images when subtracting frames acquired before and after the molecule landed on the surface 31'. For eliminating the effect of wavefront corrugations in this imaging mode, the lateral position of the sample can be modulated by a few hundred nanometers using a piezoelectric scanner. Using a high-speed CMOS camera and synchronized lock-in detection, the image corresponding to the scattering of sensor surface is extracted.

The prior art iSCAT technique has been demonstrated in the past for proving an extremely high detection sensitivity by sensing single molecules. The application of the iSCAT technique was restricted to detecting one single particle type under investigation, like e.g. molecules of a certain protein, wherein the particles have been provided on the sensor surface with a predetermined deposition scheme e.g. using a micropipette. One challenge of iSCAT detection is analysis of complex mixtures of macromolecular particles comprising a diversity of molecular masses between e.g. 1 kDa and 1 MDa and concentration differences of up to 8 orders of magnitude.

The strong interferometric signal due to detection of large macromolecular species and species arriving at high concentrations make the detection of smaller particles with weaker interferometric signal and/or arriving at lower concentrations challenging.

Objective of the Invention

The objective of the invention is to provide an improved method of detecting particles, being capable of avoiding limitations of conventional techniques. Another objective of the invention is to provide an improved detection apparatus for analysing sample substances including particles, being capable of avoiding limitations of conventional techniques. In particular, the detecting method and the detection apparatus are to be provided with increased sensitivity capable of single biomolecule detection and/or with reduced sample preparation requirements compared with conventional separation techniques.

SUMMARY OF THE INVENTION

The above objectives are solved correspondingly with a method and an apparatus for detecting particles.

According to a first general aspect of the invention, the above objective is solved by a method of separating particles, based on their specific features, e.g. charge, size, shape, density, and detecting the particles as series of single light scattering events created by the individual particles. A sample substance including the particles to be detected is provided on a source side of a separation path, the sample substance is subjected to a separation force, so that the particles move along the separation path, e. g. with specific particle velocities or to specific locations, and the particles are spatially separated from each other along the separation path, so that they have specific arrival times at a downstream target side of the separation path, and the separated particles are individually detected in a detection volume. The arrival times depend on the particle features and the separation force used. As an example, the arrival times are determined by different particle velocities along the separation path. According to the invention, the detecting step comprises an interferometric sensing of a series of single scattering events created by the individual particles bound or transient in the detection volume, wherein parameters of scattering light signals, e.g. the interferometric contrast, obtained from the interferometric sensing are analysed for obtaining specific particle features, e.g. size, mass, shape, charge, and/or affinity of the particles.

According to a second general aspect of the invention, the above objective is solved by a detection apparatus being configured for detecting particles, preferably with the method according to the above first general aspect of the invention, comprising a separation device having a separation path, having a source side and a downstream target side, and a separation force generator, wherein the source side of the separation path is adapted for accommodating a sample substance including particles to be detected and the separation force generator is capable of creating a separation force moving the particles from the sample substance along the separation path towards the target side, and a detection device being adapted for scattering light based detecting of the particles in a detection volume. According to the invention, the detection device comprises an illumination light source, in particular emitting a radiation of a wavelength in the visible, ultra violet or infrared region, preferably between 100 nm and 2000 nm, imaging optics and a sensor device being arranged for an interferometric sensing of a series of single scattering events created by the individual particles in the detection volume, and the detection device is coupled with an analysing unit being adapted for analysing of scattering light signals obtained from the detection device and for obtaining specific particle features of the particles.

The separating step generally includes separating the particles by the effect of a specific separation force including at least one of an electric force, an isoelectric focusing force, a flow force, a magnetic force, a mechanical force and an optical force. Separating the particles includes separating the particles of one particle type from particles of at least one other particle type and/or from remaining components of the sample substance.

Advantageously, available separation methods and devices are used, wherein the separation path is provided by the separation medium, e.g. a liquid or gel, and the separation force generator is adapted for generating the separation force. According to particularly preferred applications of the invention, the invention uses electrophoresis, e.g. a capillary electrophoresis or gel electrophoresis, or chromatography separation, or isoelectric focusing, and the separation path comprises an electrophoresis separation path or a chromatography separation path or a pH gradient adapted for isoelectric focusing, resp. An electric separation force is created by electrodes on source and target sides of the electrophoresis separation path, while a flow force and/or another mechanical force, like gravity, is created along the chromatography separation path. Furthermore, an extension of the detection scheme to other separation methods is readily available in combination with e.g. High-Performance Liquid Chromatography (HPLC), size exclusion chromatography, column chromatography, or thin-layer chromatography. Additionally or with alternative applications of the invention, using e.g. a microfluidic channel as a separation path, magnetic forces and/or optical forces can be used for separating the particles.

The term "particle" generally refers to any particle comprising at least one of a nanoparticle, macromolecular particle, single macromolecule (or: molecule), dimer, aggregate of macromolecules, colloidal particle, inorganic nanoparticle, particle having dimensions below the wavelength of illumination, metallic particle, polymer particle, virus, extracellular vesicle, exosome, and biological macromolecule, in particular protein, carbohydrate, or nucleic acids molecule. The particles to be detected typically have a characteristic dimension, e.g. diameter or extension, preferably below $\lambda/2$ (where $\lambda$ is the wavelength of the light used for the interferometric sensing) to avoid resonances. The lower size limit depends on the particle density, polarizability, and consequently the scattering cross section and is typically on the order of 1 nm, or, for weakly scattering particles, such as proteins in aqueous solutions, in particular 3 nm corresponding to a scattering cross section of $10^{-12}$ µm. Furthermore, the particles preferably have a mass in a range of 10 kDa to 10 MDa and/or a predetermined polarizability. However, the size limits of detection depend mostly on the noise characteristics of the used electronics and detecting smaller molecules is possible as the result of future technological progress. Consequently the real physical limits are in the maximum power the particle can withstand which may vary from species to species and for non-absorbing particles e.g. single proteins can be as large as several watts focused tightly on the particle.

The term "sample substance" generally refers to a sample including the particles to be separated and detected. Particles of one single particle type, e.g. one single chemical composition and/or geometrical configuration, or different particle types, e.g. multiple chemical compositions and/or geometrical configurations, can be included in the sample substance. Preferably, the sample substance comprises a liquid including the particles. The liquid can be obtained in a separate preparation step, e.g. providing and optionally purifying and/or concentrating a body fluid from an organism under investigation. However, due to the high sensitivity of the inventive technique, the sample substance does not necessarily require a purifying and/or concentrating step. Thus, according to a particularly preferred application of the invention, the sample substance may comprise a biological tissue or a part thereof or at least one biological cell or a part thereof, located at the source side of the separation path.

The interferometric sensing of a series of single scattering events comprises an interferometric scattering detection (iSCAT), including in particular illuminating the detection volume with illumination light and repeated sensing of the interference (superposition) of the light scattered by scattering sources, i.e. the individual particles, with the reflected or transmitted illumination light. Sensing of the interference comprises collecting scattering light signals including a series of interference images of the detection volume or interference intensities in at least one focal position in the detection volume. Advantageously, the scattering light signals provide specific particle features of the particles. Particle features comprise e.g. a particle mass or volume obtained from the size and/or contrast of spots of scattering sources in the scattering light signals, and/or a particle charge and/or concentration obtained from arrival times of scattering sources in the scattering light signals, and/or a particle type (chemical composition of the particle) obtained from an affinity-based detection using e.g. a ligand-functionalized surface. The particle features are obtained directly from the scattering light signals as such or from temporal fluctuations of the scattering light signals identifying the scattering source contributions in the scattering light signals. The temporal fluctuations are provided by increments of the scattering light signals (differential or incremental scattering light signals) collected in series.

As an important advantage of the invention, the interferometric scattering detection provides a single particle detection system, which is combined with the particle separation. Advantageously, the combination of single molecule sensitivity e.g. with an electropherogram readout offers a chance to increase the limit of detection by more than six orders of magnitude when compared to commercial implementations and by four orders of magnitude when compared to the most sensitive laboratory achievements. The invention allows for separation and readout e.g. of a complex biomolecular sample with a single molecule sensitivity as well as specific detection of individual bands comprising as little as one single particle, e.g. protein.

As a further essential advantage, analysing by orders of magnitude less concentrated samples allows for simple sample preparation where native samples can be used directly. This would mean analysing protein solutions without concentration steps or DNA samples without PCR amplification. Protein discovery and drug development would not suffer from limited sensitivity any longer, and a range of biomarkers can be detected which may lie below the detection limit of conventional detection methods. Furthermore, chromatography approaches with single-DNA sensitivity open new prospects for single DNA sequencing.

Accordingly, a new label-free analytical method for quantitative analysis of complex mixtures of particles is provided which is directly applicable to sample solutions at extremely low volumes and concentrations corresponding to a detection range between $10^{-23}$ mol and $10^{-12}$ mol. The inventive method separates components of the sample substance and simultaneously detects an absolute measure of the amount or concentration of every particle species contained in the sample solution with the minimum detection limit of a single particle. Simultaneously the method is capable of detecting an absolute measure of the molecular size of all detected particles via the amplitude of the particle electric polarizability. Finally the method is capable of detecting other parameters commonly accessible using conventional separation methods such as charge, shape, pI or affinity.

According to a preferred embodiment of the invention, the detection volume includes a detection surface preferably being arranged at the downstream target side of the separation path or as a part of the separation path (first embodiment of the invention). The particles to be detected are bound to the detection surface of the detection volume during the detecting step. The detection surface preferably is arranged with a distance from an opening end of the separation path on the target side thereof. The particles are moved to the detection surface by the effect of the separation force and diffusion of the particles through the detection volume. Preferably, the distance between the detection surface and the opening end is selected such that the effect of the diffusion dominates the effect of the separation force.

According to further variants of the invention, the opening end of the separation path has a tapered shape directed to the detection surface, and/or the separation path is arranged such that the opening end is arranged out of a focus of the illumination light source. Advantageously, these features allow for delivering particles arbitrarily close to the detection surface and maximize the probability of particle binding.

According to a further modification of the first embodiment of the invention, the particles can be driven towards the detection surface by the effect of an electric driving force, which is created by a gate electrode arranged on a back side of the detection surface. Optionally, an AC voltage of an AC voltage source can be applied to the gate electrode. The AC voltage will help to drag charged molecules to the detection surface and periodically push unbound or loosely bound molecular species and ions away from detection surface.

Preferably, the interferometric sensing of the single scattering events is obtained by the following steps. The detection surface is illuminated with illumination light, preferably coherent illumination light, like continuous wave or pulsed laser light. A series of interferometric images (frames) of the illuminated detection surface is collected. Each frame is determined by a superposition of a background reference portion of the illumination light being reflected or transmitted at the detection surface and a scattered portion of the illumination light created by the particles. Temporal fluctuations of the image of the detection surface can be associated with bindings or unbindings of e.g. individual protein molecules or other particles to the detection surface. Furthermore, the inventors have found that the rate of particle delivery and binding obtained with the separation step is slow enough, so that only a few particles bind during the time of acquiring one frame (one differential scattering light signal), which is at least 1 μs, in particular at least 100 μs, and/or at most hours, in particular at most 10 s. This is manifested by spatially localized fluctuations within a spot limited by the diffraction of light which is known from the imaging properties of the instrument. The interferometric images provide the scattering light signals to be analysed for obtaining the specific particle features of the particles.

Preferably, analysing the scattering light signals includes subjecting the frames to at least one of a background subtraction procedure, a background interpolation procedure, a dynamical filtering procedure, and correlation-based extraction of modulated background. In background subtraction procedure each current interferometric image is referenced with at least one previous interferometric image and the particles are detected based on temporal intensity fluctuations in the interferometric images. Background interpolation procedure uses a model function predicting the background image, fits the static or slowly changing features of the background image and reference each current interferometric image with at least one of the model functions of the background. Correlation-based extraction uses an external force to modulate features of the background image such as its lateral position or focus plane, or features of the particles e.g. their trajectory by modulated separation force and correlates changes detected in the interferometric images with the modulation frequency and phase. The temporal intensity fluctuations can be obtained by a statistical processing of the differential scattering light signals.

According to a further variant of the first embodiment of the invention, the detecting step comprises detecting of binding and/or unbinding events of particles on the detection surface. Advantageously, a change can be detected. The unbinding can be important because in the case of a specific surface binding, the average time until a detection of an unbinding event indicates the affinity of the interaction. Accordingly, another analytical information about the particular particle, e. g. molecule is obtained.

The particles can have a further activity in the bound state on the detection surface. Accordingly, with a further preferred variant of the first embodiment of the invention, the detecting step comprises detecting motion properties of the particles on the detection surface. As an example, the particles can move through the detection volume confined to the detection surface by the effect of the separation force or diffusion. The detection surface binding the molecule can comprise e. g. a charged, non-binding surface, in particular a two-dimensional lipid membrane. Advantageously, detecting a biomolecule e. g. on the lipid membrane and tracing its diffusion or other motion is possible. This allows to measure additional parameters of the molecule such as diffusivity or affinity in the same process. In particular, besides the information about the particle contrast (size) and arrival time (size/charge/mobility measure), the diffusivity or other mobility associated with the particle can be measured. This can be obtained in particular with nanoparticles, single molecules or vesicles.

According to an alternative embodiment of the invention, the particles to be detected are moved through the detection volume during the detecting step (second embodiment of the invention). This approach to the separation readout is based on direct observation of unbound particles passing through the detection volume positioned e.g. inside a capillary or a nano-fluidic channel, e.g. of a capillary electrophoresis device. The depth of focus of iSCAT image is typically limited to less than one wavelength (e.g. 300 nm). Moreover the contrast of a scattering object varies across this depth of focus from maximum constructive interference (a peak) to maximum destructive interference (a dip). In order to confine the particles passing through the detection volume and achieve single-particle sensitivity for the transient particles, preferably a channel of comparable depth along the illumination direction (e.g. 100 nm to 500 nm) is used, like at least one of nano-fluidic channel, nanocapillary or a locally tapered capillary. Accordingly, the detection volume of the capillary, tapered capillary or a nano-fluidic channel is indicated as a nanochannel. With the second embodiment of the invention, the detector device (iSCAT detector) is imaging and tracking differences in scattering signal caused by 1D movement of individual particles inside the nano-channel. The underlying principle of the interferometric detection of the single-particle scattering is identical to the approach previously described with reference to the first embodiment. However, in this approach the particle is confined into one dimension motion rather than immobilized on the detection surface.

Advantageously, the second embodiment allows an inline detection of the particles and a facilitated adaptation of available separation devices for the implementation of the invention. The interferometric sensing of the single light scattering events is obtained while the individual particles migrate in the detection volume, e.g. by diffusion and/or an external force. Preferably, the detection volume is a section of the separation path, and the particles are moved through the detection volume by the effect of the separation force. The section of the separation path provided as the detection volume is located e. g. at the half length or in a downstream half of the separation path. The arrival times of the particles can be modulated by a modulation of the separation force and the scattering light signals obtained from the interferometric sensing are analysed by a lock-in-technique in dependency on the modulation. According to this advantageous embodiment, the SNR of sensing the scattering light signals can be improved.

According to a preferred variant of the second embodiment of the invention, the interferometric sensing of the single scattering events is obtained by illuminating the detection volume with illumination light and collecting a series of interferometric images of the illuminated detection volume comprising a superposition of a background reference portion of the illumination light being reflected at or transmitted through the detection volume and a scattered portion of the illumination light created by the particles. The interferometric images provide the scattering light signals to be analysed for obtaining the specific particle features of the particles. Preferably, analysing the scattering light signals includes a background subtraction procedure, wherein each current interferometric image of the nano-channel is referenced with at least one previous interferometric image and the particles are detected based on temporal intensity fluctuations in the interferometric images.

As the problem of single particle detection traveling inside a nano-channel is a one-dimensional problem, single point detection can be readily achieved by monitoring temporal fluctuations in iSCAT signal generated by particles passing through a single tight focus of a laser beam in a confocal configuration. Thus, according to an alternative variant of the second embodiment of the invention, the interferometric sensing of the single scattering events is obtained by illuminating the detection volume with illumination light being focused to at least one focus position in the detection volume and collecting interferometric light signals at the at least one focus position comprising a superposition of a background reference portion of the illumination light being reflected at or transmitted through the detection volume and a scattered portion of the illumination light created by the particles at the at least one focus position. The interferometric light signals provide temporal series of the scattered light fluctuations to be analysed for obtaining signatures of single particle transitions as well as the specific particle features of the particles.

Preferably, at least two focus positions can be illuminated in the detection volume and the interferometric light signals are collected at the at least two focus positions, wherein the interferometric light signals are subjected to a correlation analysis.

The inventive analytical method for quantitative analysis of complex mixtures of macromolecular or other particles is based on a combined effect of iSCAT detection for localization and tracking of single particles and a particle separation technique, like electrophoresis separation. The detection and analysis is by more than six orders of magnitude more sensitive comparing to the available commercial solutions of macromolecular separation and detection e.g. using capillary electrophoresis or PAGE method. At the same time, the iSCAT detection providing a means for ultrasensitive detection of macromolecular samples could be used as such in complex mixtures of macromolecular particles featuring range of different sizes at a large diversity of concentrations. As native samples are often too dilute for analysis using conventional electrophoresis, methods such as lyophilization, spin concentrators, dialysis, or precipitation are used to concentrate the protein sample prior separation. The possibility of avoiding the concentration steps offers simpler, faster and cheaper analytics, and in addition, it solves numerous issues where the pre-treatment protocol may interfere with the functionality of the investigated protein sample. The detection method of imaging the scattering cross section of each detected particle allows for intrinsic calibration where the absolute size of each molecule is determined by an independent method. The sample consumption is essentially reduced: As a result of the sensitivity improvement, several orders of magnitude less material is required for each separation task. This is useful in applications with extremely low sample yield such as single cell biology, forensic science, archaeobiology, etc. At the ultimate limit the proposed method offers sufficient sensitivity for performing e.g. DNA sequencing of a single chromosome sample. Finally, the particles can be detected without molecular labels (label-free separation and detection).

BRIEF DESCRIPTION OF THE DRAWINGS

Further details and advantages of the invention are described in the following with reference to the attached drawings, which show in.

PREFERRED EMBODIMENTS OF THE INVENTION

Preferred embodiments of the invention are described in the following with exemplary reference to the combination of a capillary electrophoresis or gel electrophoresis based separation with the interferometric scattering detection. It is emphasized that the implementation of the invention is not restricted to the application of the described separation methods, but rather possible with other separation techniques, including other electrophoresis separations, chromatography separation, separation by isoelectric focusing in a pH gradient, an acceleration-based separation of different molecular charges and/or other magnetic or optical separation methods. Furthermore, exemplary reference is made to the application of the iSCAT technique as described in publication [11] and shown in FIG. 7. The implementation of the invention is not restricted to this particular iSCAT set-up, but rather possible with modified versions of the interferometric scattering detecting, e.g. as described in publications [8] to [10] and [12]. Furthermore, the particular features of the iSCAT set-up, like the selection of appropriate illumination light (wavelength, intensity), the configuration of the imaging optics or the configuration of the sensor device are selected in dependency on the particular conditions of applying the invention.

Details of the separation techniques, e.g. the capillary electrophoresis or the gel electrophoresis, like the selection of an appropriate separation medium, dimensioning the length of the separation path and controlling electrical separation voltages, are not described as they are known as such from conventional separation techniques. In particular separation gels and buffers can be selected according to the types of particles to be detected. As an example, an agarose gel can be used as it is known from electrophoresis, isoelectric focusing, 2D electrophoresis or the like.

Reference is made in the following to the separation and detection of particles. It is emphasized, that the implementation of the invention is not restricted to certain particle types, like single macromolecular particles, but rather possible in particular with the particle types noted above.

Figure 1:
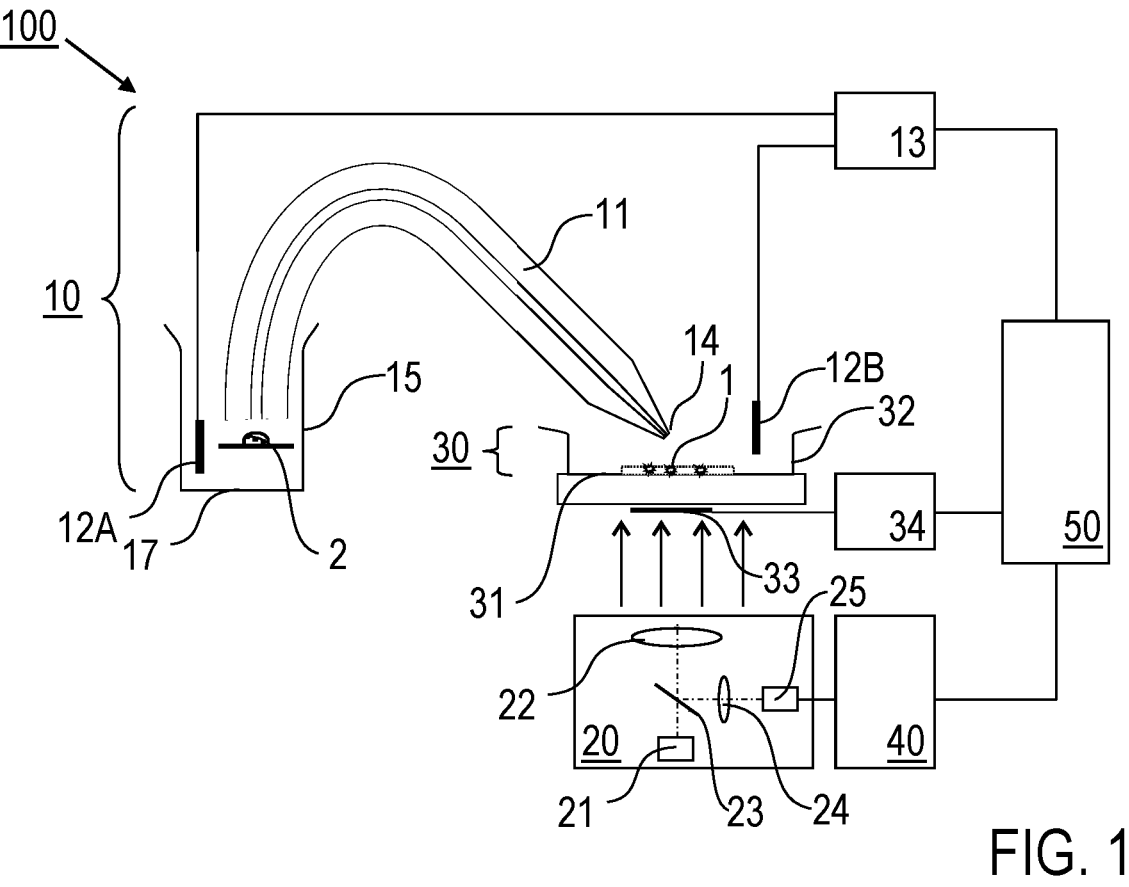
FIG. 1: a schematic illustration of a detection apparatus according to the first embodiment of the invention, including a capillary electrophoresis configuration.

FIG. 1 schematically illustrates the detection apparatus 100 according to the first embodiment of the invention, comprising the separation device 10, the detection device 20, the detection volume 30, the analysing unit 40 and a control device 50. In a practical implementation of the invention, the components 10 to 50 can be integrated as a compact laboratory device, being housed in a common enclosure. Alternatively, a module structure of the detection apparatus 100 can be provided, wherein the components 10 and 30 can be exchanged, e.g. for combining the detection device 20 with different types of separation devices 10. The control device 50 includes a computer based control of the detection apparatus 100, in particular for controlling the separation force generator of the separation device 10 and the detection device 20 with the analysing unit 40. Both the analysing unit 40 and the control device 50 can be implemented with a common computer unit.

The separation device 10 comprises a separation path 11 and a separation force generator 12A, 12B, 13. The separation path 11 is a capillary extending from a source side located in a sample container 15 to a target side located in a target container 32. The capillary is filled with a liquid buffer or a gel matrix and can have a polymer or other low binding coating on the wall as it is known from capillary zone electrophoresis. The inner diameter and length of the capillary are selected in dependency on the application conditions. With a practical example, the inner diameter is 50 μm, and the length is 50 cm.

The sample substance 2 including the particles to be investigated is located at the source side of the separation path 11. The sample substance 2 may comprise e.g. a liquid solution comprising a heterogeneity of proteins, DNA molecules, carbohydrates or other complex biological molecules, included in the sample container 17. Alternatively, the sample substance 2 may comprise a biological cell, cell group or tissue located on a carrier in the sample container 17 in a cultivation medium. The source side end of the separation path 11 is immersed into the sample container 17 so that a fluid connection between the sample substance 2 and the buffer or gel within the separation path 11 is obtained.

The other end of the separation path 11 is immersed in the target container 32 including the detection volume 30, in close vicinity of a detection surface 31 thereof. The capillary of the separation path 11 has a tapered opening end 14, which has tip shape on the target side of the separation path 11. Accordingly, a small detection volume can be reached more precisely. Furthermore, particles exiting the separation medium in the separation path 11 enter the detection volume 30 in the neighborhood of the detection surface 31.

The separation force generator comprises two electrodes 12A, 12B, which are connected with a separation voltage source 13. The first electrode 12A (usually the anode) is arranged at the source side of the separation path 11 with electric connection to the sample substance 2 and the separation medium in the separation path 11. Typically, the first electrode 12A is immersed into the liquid in the sample container 17. The second electrode 12B (usually the cathode) is arranged at the target side of the separation path 11. The second electrode 12B is arranged in the vicinity of the detection surface 31, e.g. as a freestanding electrode immersed in the target container 32. Alternatively, the second electrode 12B can be a transparent electrode (e.g. ITO) placed directly at the detection surface 31 or a metallic coating deposited onto a surface in close proximity of the detection surface 31.

The detection volume 30 is provided by the target container 32, e.g. a cuvette filled with a liquid, like water or buffer. The target container 32 has a transparent bottom wall, it is made of e.g. glass or plastics. The bottom wall of the target container 32 provides the detection surface 31, which binds particles 1 to be detected from the detection volume 30 either specifically or non-specifically.

As an optional feature illustrated in FIG. 1, the detection volume can be provided with a gate electrode 33, which is connected with a gate voltage source 34. The gate electrode 33 is arranged between the detection surface 31 and the detection device 20, and it may comprise e.g. a transparent electrode (e.g. ITO) or a ring electrode. By applying a voltage to the gate electrode 33, particles 1 can be driven from the opening end 14 towards the detection surface 31. If an AC voltage is applied to the gate electrode, a removal of unbound or loosely bound particles away from the detection surface 31 can be facilitated.

Figure 7:
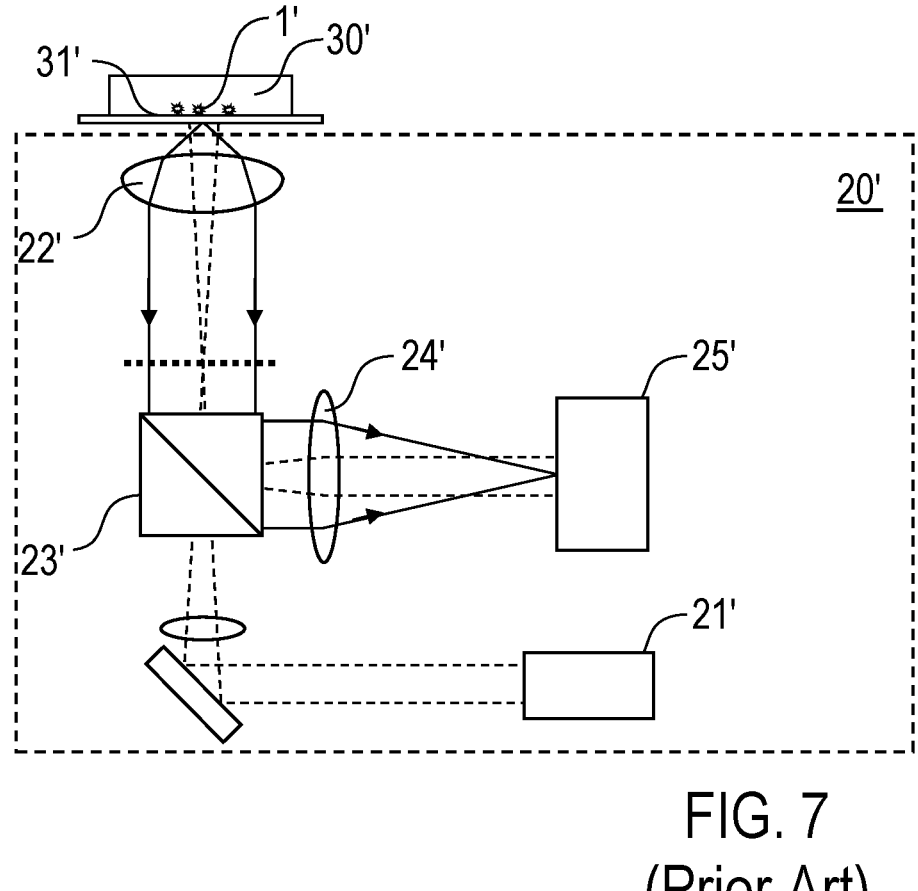
FIG. 7: a schematic illustration of a conventional interferometric scattering detection device, which is preferably used according to the invention.

The detection device 20 comprises an illumination light source 21, imaging optics 22, 24, a beam splitter 23 and a sensor device 25. The components 21 to 24 are schematically illustrated, and they can be arranged and designed as shown in FIG. 7 and/or described e.g. in publication [11], which is incorporated to the present specification by reference, in particular with regard to the technical disclosure of FIG. 1 in [11] and the description thereof as well as the description of camera signal processing and background subtraction. The detection device 20 detects all particles 1 in the detection volume 30 that bind to the detection surface 31 during the measurement with single particle sensitivity, e.g. single-protein sensitivity, as follows.

The illumination light source 21, like a continuous wave or pulsed laser, creates a parallel beam of monochromatic or polychromatic light, which is directed via the beam splitter 23 and a microscope objective 22 of the imaging optics to the detection surface 31. The detection surface 31 on the upper side of the bottom wall of the target container 32 is illuminated, so that scattering occurs at particles 1 bound to the detection surface 31. The imaging optics including the microscope objective 22 and an imaging lens 24 between the beam splitter 23 and the sensor device 25 project an image of scattered light of the detection surface 31 onto a 2D sensor array of the sensor device 25 (e.g. a CMOS camera). The optical radiation reflected from the detection surface overlaps and interferes on the sensor device 25 with optical radiation scattered at the detection surface 31. Accordingly, the sensor device 25 collects an interferometric image, which is determined by a phase-shift between the reference wave reflected at the detection surface 31 and the scattered wave created at the particles 1, in particular being provided by the so-called Gouy phase.

For conducting the inventive method of detecting particles 1 with the detection apparatus 100 according to FIG. 1, the sample substance 2 is positioned in the sample container 15. By the application of the separation force via an electrical current between the electrodes 12A, 12B, charged or polarizable particles are extracted from the sample substance 2 and driven through the separation path 11 to the detection volume 30. Particles which enter the detection volume 30 move towards the second electrode 12B as well as diffuse randomly within the detection volume 30. The fraction of particles 1 bound to and detected at the detection surface 31 relative to the total number of particles entering the detection volume 30 depends on the geometry of the detection volume 30 and the position of the second electrode 12B. The best yield of binding particles 1 to the detection surface 31 can be achieved in a configuration, where the diffusion dominates the electric field drag mobility of the particles. If the mass transport rate through the liquid in the detection volume 30 limits the amount of detected particles (e.g. due to the need for a higher separation voltage between the electrodes 12A, 12B), the gate electrode 33 can be used for additionally driving the particles towards the detection surface 31.

Figure 2:
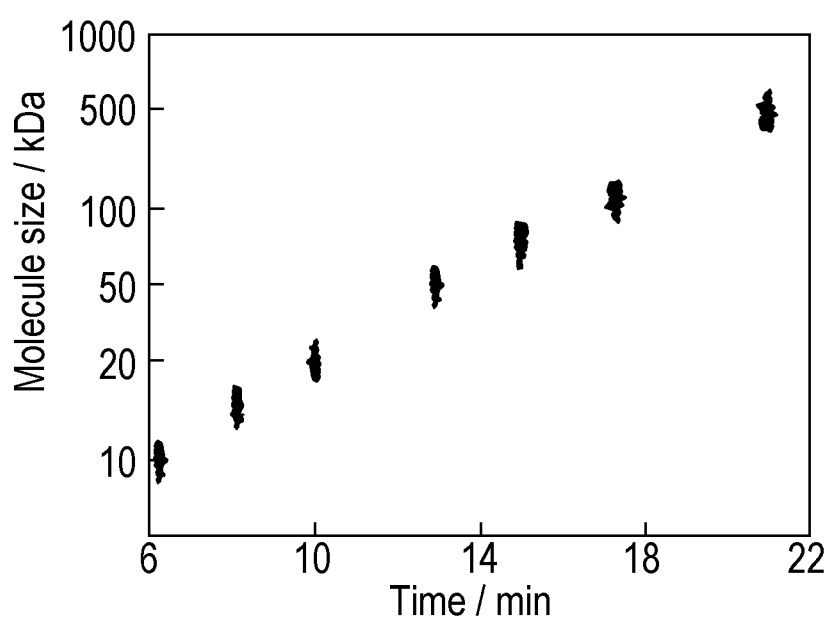
FIG. 2: a graphical illustration of experimental results obtained with the detection apparatus according to FIG. 1.

Interferometric images collected with the sensor device 25 are processed with the analysing unit 40. Temporal and special fluctuations in a time series of interferometric images are processed with a software running in a computer circuit of the analysing unit 40. On the basis of the statistics of individual binding events recorded at the detection surface, an electropherogram is obtained as illustrated in FIG. 2. The electropherogram is built as a function of the arrival time of the particles and the absolute measure of the particle scattering cross section, which is proportional to the molecular mass of the particles. With the illustrated experimental result, each vertical band corresponds to proteins detected within one time frame, e.g. propagating at the same velocity through the separation path 11, and the vertical position holds an independent information of the size of the protein molecule measured via scattering. As the arrival time depends on several factors in capillary electrophoresis, which are other than the protein molecule size, multiple protein molecule characteristics can be simultaneously extracted from a single particle detection, e.g. molecular mass and charge.

Figure 3:
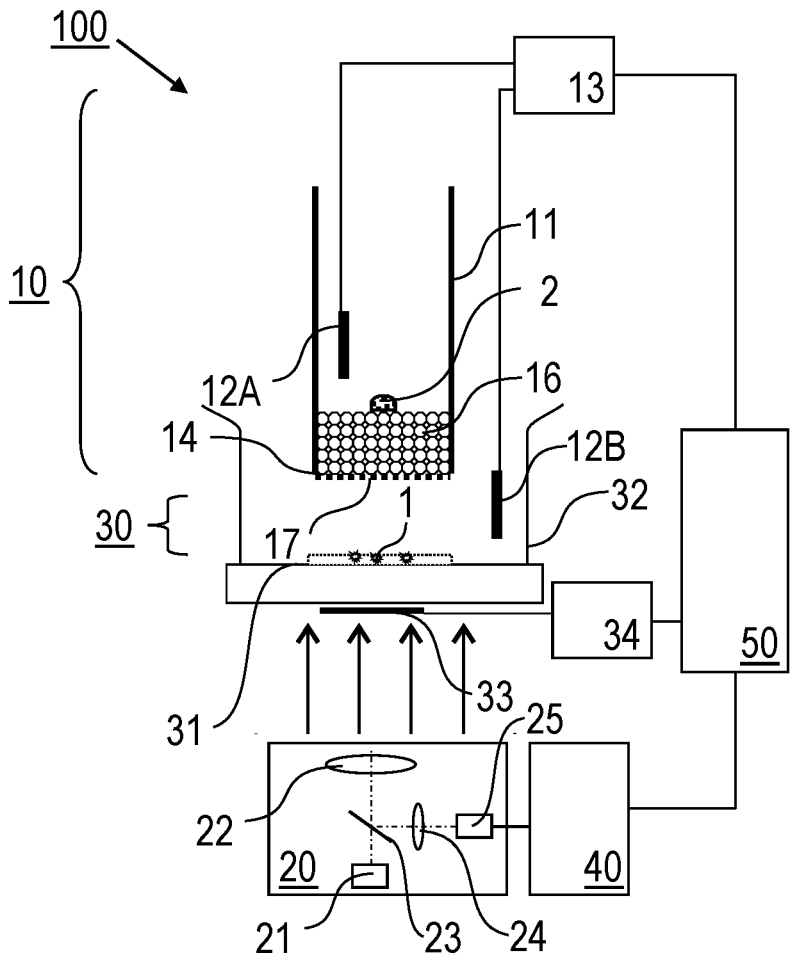
FIG. 3: a schematic illustration of another detection apparatus according to the first embodiment of the invention, including a gel electrophoresis configuration.

FIG. 3 schematically illustrates features of an alternative detection apparatus 100 according the first embodiment of the invention, which is adapted for a gel electrophoresis based separation. The detection apparatus 100 comprises the separation device 10, the detection device 20 with the analysing unit 40, the detection volume 30 and the control device 50 as described with reference to FIG. 1. Deviating from FIG. 1, the separation device 10 includes a separation path 11, which is provided by a gel layer confined in a column, which is covered with a running electrophoresis buffer.

With more details, the separation path 11 comprises a column which is vertically oriented and filled with an electrophoretic gel 16 as the stationary phase. At the opening end 14 of the separation path 11, a permeable supporting membrane 17 is provided. The electrophoretic gel 16 comprises e.g. a polyacrylamide gel, an agarose gel or a similar gel separating matrix, carrying the sample substance 2. The thickness of the gel layer in the separation path 11 may vary in dependency on the separation voltage and the size range of particles to be separated. The permeable membrane 17 comprises e.g. a silicon nitride membrane with an array of pores, a protein separation membrane or another porous layer, frit or other plug preventing the loss of the stationary phase.

The separation force generator in the embodiment of FIG. 3 comprises a first electrode 12A located within the separation path 11 and a second electrode 12B located in the target container 32. The electrodes 12A, 12B are powered by the separation voltage source 13 connected with the control device 50. As described with reference to FIG. 1, the second electrode 12B can be a transparent electrode placed directly at the detection surface 31, a metallic coating in close proximity of the detection surface 31 or a freestanding electrode place in the target container 32. The target side of the separation path 11 is suspended in the target container 32, so that the opening end 14 is located out of focus of the microscope objective 22 of the detection device 20.

The detection volume 30 is provided as described above with reference to FIG. 1. The detection surface 31 binds the particles 1 specifically or non-specifically. The diffusing of the particles from the opening end 14 towards the detection surface 31 can be supported by the effect of the optional gate electrode 33. The bound particles 1 are detected with interferometric imaging using the detector device 20 as described above. Again, an electropherogram is built up from the statistics of individual binding events recorded at the detection surface 31 as the function of the arrival time and absolute measure of the particle scattering cross section. Furthermore, two-dimensional protein characteristics can be extracted from the single particle detection as mentioned above.

As an alternative to the first embodiment of the invention illustrated in FIG. 3, the separation device 10 can be adapted for a chromatography based separation rather than for electrophoresis based separation. In this case, the separation path 11 is a liquid chromatography column, and the separation force generator is a flow source as it is known from liquid chromatography. Particles migrate along the separation path 11 by a pressure difference instead of an electric voltage, and the separation is obtained by the separation medium retention time rather than electric mobility.

Figure 4:
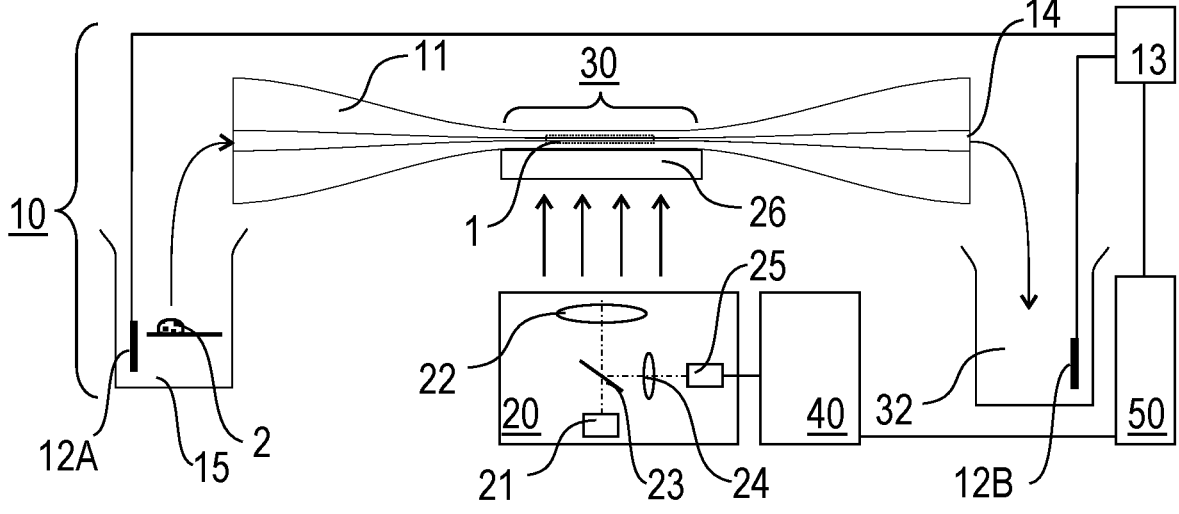
FIGS. 4 to 6: schematic illustration of detection apparatuses according to the second embodiment of the invention, having an inline detection configuration.
Figure 5:
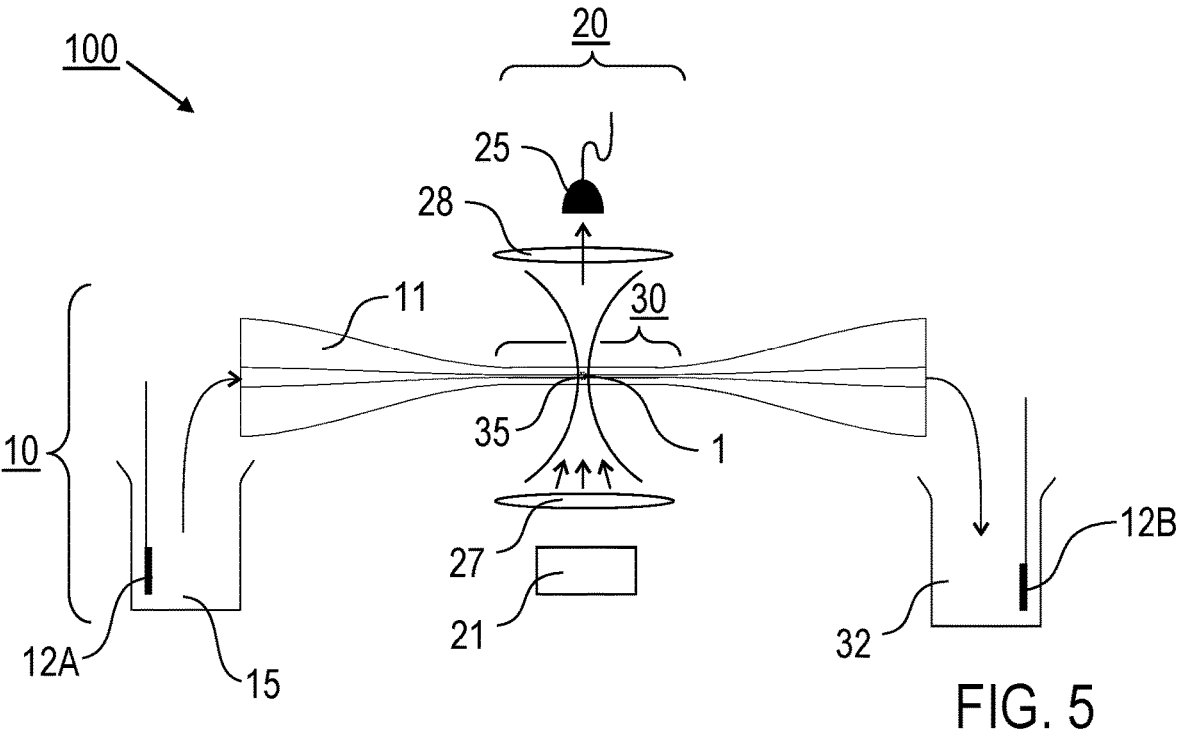
Figure 6:
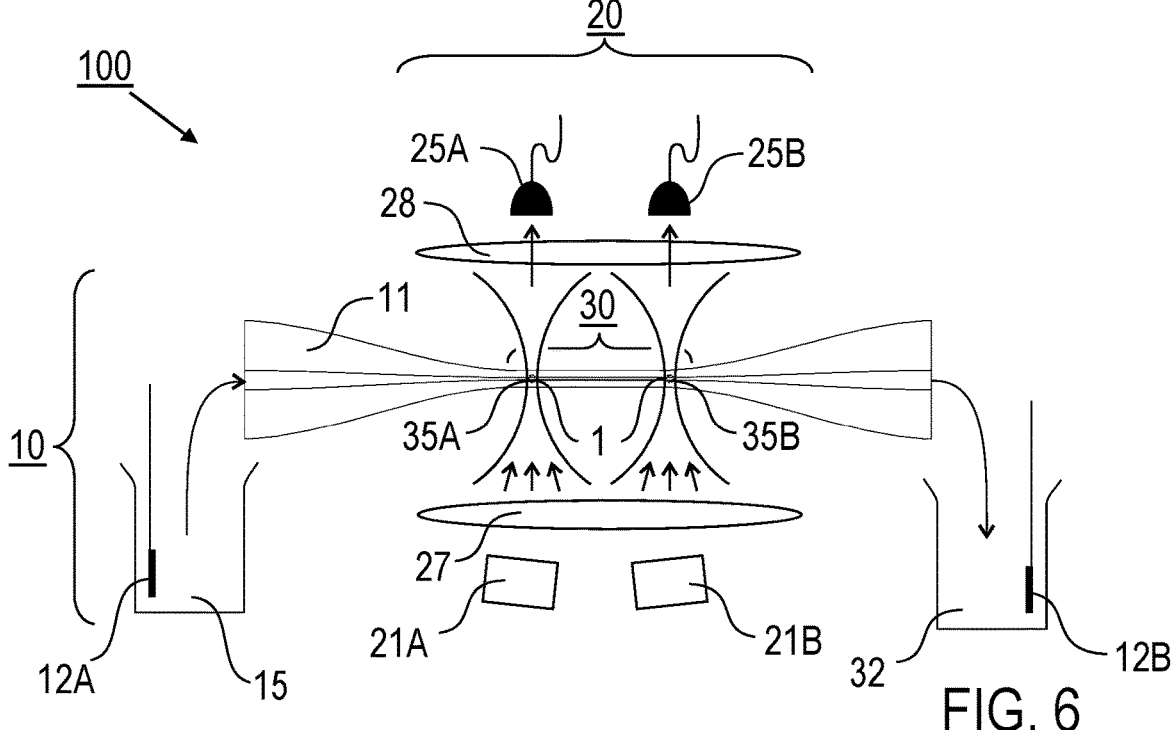

FIGS. 4 to 6 illustrate the second embodiment of the invention, wherein the particles to be detected move through the detection volume 30 during the detection. Preferably, the detection volume 30 is a section of the separation path 11. Alternatively, the detection volume can be located downstream from the opening end 14 of the separation path 11 (not illustrated). With the second embodiment of the invention, the interferometric sensing of a series of single light scattering events created by the individual particles comprises collecting a series of interferometric images of the separation path section including the detection volume 30 (FIG. 4) or collecting interferometric light signals at one or more focus positions in the detection volume 30 (FIGS. 5, 6).

According to FIG. 4, the inventive detection apparatus 100 comprises the separation device 10, the detection device 20, the detection volume 30, the analysing unit 40 and the control device 50. The detection device 10 comprises the separation path 11 and the separation force generator with the first electrode 12A, the second electrode 12B and the separation voltage source 13. Basically, the separation device 10 is designed as described above with reference to FIG. 1. The sample substance 2 is provided in the sample container 15 on the source side of the separation path 11. After separation, the non-stationary phase is collected in the target container 32.

The separation path 11 is a capillary, e.g. with an inner diameter of 50 μm and a length of 50 cm. In order to confine the particles passing through the detection volume 30, a nanocapillary or a locally tapered capillary with a cross-sectional dimension of e.g. 200 nm at the detection volume 30 is used. The separation medium in the capillary is a buffer or a gel matrix as used in capillary zone electrophoresis. The surrounding of the separation path 11 around the detection volume 30 is immersed in a refractive index matching liquid, e.g. an oil.

The detection device 20 is provided as described above with reference to FIGS. 1 and 7. Transient particles 1 in the separation path 11 are illuminated through a transparent plate 26 made of e.g. glass, and the capillary wall. The transparent plate 26 is a reference dielectric mirror of a low reflectivity (e.g. reflectivity of less than 1%), and it comprises e.g. a coverslip coated with a reflective dielectric layer. The reference wave is created upon reflection at the reference mirror surface of the transparent plate 26 and interferes with the light scattered from analyte particles flowing inside the capillary. The distance between the detection volume 30 and the reference mirror 26 is smaller than the coherence length of the incident light. In another configuration the transparent plate 26 with dielectric mirror can be placed above the separation path or the transmitted radiation can be used as the reference wave and the transparent plate 26 can be removed (not shown). The sensor device 25 collects scattered and reference light through the capillary wall. During the migration of the particles through the detection volume 30, a series of interferometric images is collected, which are processed with the analysing unit 40.

At sufficiently low concentrations it can be considered that there is only one analyte particle, e.g. one molecule being transferred through the nano-channel of the separation path 11. For a typical 1 nM concentration of the analyte and a channel diameter of 100 nm the average distance between individual macromolecules is approximately 200 μm (inverse proportional to the concentration). Therefore, the molecules pass through the detection volume 30 one at a time in the low nM concentration range, e.g. below 100 nM. Samples with higher concentration would be diluted.

In order to detect transitions of single particles through the detection volume 30 an image of the particle is recorded at each position within the detection volume 30 using the previously described iSCAT imaging method and short exposure time. The required exposure time is typically less than 1 ms, as limited by the speed of the molecule and the size of the diffraction limited spot. Achieving sufficiently low noise within such a short exposure might be challenging with current state of the art in 2D imaging technology. However, it can be readily achieved by replacing the 2D CMOS camera with a simpler and faster 1D photodiode array (see FIGS. 5, 6). The 1D time trace of the particle position within the nanochannel also provides a direct measurement of the immediate velocity of the particle and thus its electrical mobility. It might be worth noting that unlike the detection of immobilized molecules, it is not necessary to have the contrast of a single molecule above the noise of the detection in each frame (of the short exposure). As each particle propagates through the detection volume 30 in particular direction (as well as diffuses a little) the information about a molecule transition through the detection volume 30 with contrast below the noise level can be averaged out using a time correlation of the fluctuations of adjacent pixels.

The single point detection optionally used by the second embodiment of the invention is illustrated in FIGS. 5 and 6. According to FIGS. 5 and 6, the inventive detection apparatus 100 comprises the separation device 10, the detection device 20, the detection volume 30, an analysing unit (not shown) and a control device (not shown).

With the variant of FIG. 5, the detection device 20 comprises one illumination light source 21, microscope objectives 27 and 28 and a sensor device 25 comprising a single sensor element, like a photodiode or a balanced detector. The sensor device 25 is connected with an analysing unit (not shown). The microscope objectives 27 and 28 have overlapping foci 35. The separation path 11 extends between the sample container 15 with the first electrode 12A to the target container 32 with the second electrode 12B. Particles 1 (not shown in detail) separated in the separation path 11 by capillary electrophoresis are confined in the detection volume 30 to an area with a dimension comparable to the depth of the foci 35. The position of the detection volume 30 with respect to the Rayleigh range of the foci 35 defines a phase shift between the transmitted beam and the scattered beam, so that an iSCAT contrast of the particles passing through the detection volume 30 is obtained. Fluctuations of interferometric light signals (intensity) detected with the sensor device 25 are associated with transient single particles, e.g. protein molecules. While FIG. 5 shows that the transmitted and scattered light is collected with the microscope objective 28, a mirror surface placed in a vicinity of the focus 35 e.g. above or below the separation path 11 for reflecting the transmitted and scattered light and collecting it with the microscope objective 27 can be provided.

According to the variant of the invention as shown in FIG. 6, the detector device 20 may comprise two illumination light sources 21A, 21B creating two illumination beams made incident at two different angles on the microscope objective 27, wherein microscope objective 28 collects and separates the optical radiation from two foci 35A and 35B at two point detectors 25A, 25B being connected with an analysing unit (not shown). Alternatively, the illumination light sources 21A, 21B can be replaced by one single illumination light source split into the two illumination beams entering the objective 27 at slightly different angles. Two overlapping foci 35A, 35B are created with a longitudinal distance along the extension of the separation path 11. The two laser foci 35A, 35B are separated by several micrometers (e.g. 10 μm-100 μm) within the same nano-channel of the detection volume 30. With this embodiment of the invention, false signals can be eliminated and single particle transitions can be distinguished from background fluctuations by an autocorrelation analysis of intensity fluctuations measured with the sensor devices 25A, 25B. Time series of interferometric signals collected with the sensor devices 25A, 25B are subjected to a correlation analysis. The application of the correlation analysis is possible as within the short time interval, the mobility of the transient particles can be supposed to be constant, so that the time profiles of their transitions correlate each other.

The correlation of the time series of interferometric scattering detection signals is a direct measure of the number of transient particles as well as their time delay between the two foci 35A, 35B. Therefore, this embodiment does not require a long separation path prior to the detector device as the mobility can be deduced directly from the time of flow measurement.

According to a further modification of the invention, the separation voltage created with the separation voltage source 13 (see e.g. FIG. 4) can be subjected to an AC modulation. Accordingly, the trajectory of the particles is modulated, so that the particles are imaged or pass through the foci in a periodic back-and-forth trajectory. The interferometric signals collected with the detector device 20 are modulated with the same frequency as the separation voltage. In a practical example, the frequency is selected in a range of e.g. 1 Hz to 1000 Hz. This range is obtained on the basis of the following considerations. Smaller electric fields (e.g. 10 V/cm) modulated at e. g. 1 Hz move the particles, like protein molecules back and forth by several tens of micrometers. A higher electric field (e.g. 100 V/cm) modulated at 1 kHz drags the particles back and forth by about 300 nm comparable to the size of diffraction limited spot.

Another extension of the dual-focus detection shown in FIG. 6 is using a balanced photodetector in place of the two photodiodes 35A, 35B providing an automatic self-referencing of the intensity fluctuations.

At least one of the following implementations can be provided for sensing single scattering events according to FIGS. 4 to 6. Firstly, all particles can be imaged and tracked, that are passing through the detection volume 30. This allows for a direct counting of the transient particles as a function of time. Secondly, intensity fluctuations associated with single particle transitions through the focus of the microscope objective can be detected. Thirdly, intensity fluctuations associated with single particle transitions through two spatially separated foci of the microscope objective can be detected. Subsequently, an electrophero-gram can be built up from the statistics of individual transitions of the particles as a function of time or detected transition velocities.

The features of the invention disclosed in the above description, the drawings and the claims can be of significance both individually as well as in combination or sub-combination for the realization of the invention in its various embodiments.

What is claimed is:

1. A detection apparatus being arranged for detecting particles, comprising:

a separation device having a separation path and a separation force generator, said separation path having a source side in a sample container and a target side in a target container, the separation force generator being arranged for creating a separation force along the separation path for moving the particles along the separation path toward the target side, wherein the target container includes a detection volume and said separation path has an opening end located in the target container;

a detection device being configured for detecting the particles in the detection volume: the detection device including:

an illumination light source being arranged for providing illumination light, a reflecting detection surface being arranged with a fixed distance from the opening end in the target container, said reflecting detection surface restricting the detection volume, a sensor camera, and an optical system having imaging optics, said imaging optics being arranged as a common-path interferometer for both of directing the illuminating light to the detection volume and the reflecting detection surface and collecting output light from the reflecting detection surface in reflection, the output light comprising both light scattered from the particles in the detection volume and illuminating light reflected from the reflecting detection surface, and the optical system being arranged for directing the output light to the sensor camera; and an analyzing unit coupled with the detection device and including a computer being configured for analyzing the output light detected by the detection device and for obtaining specific particle features of the particles based on the analyzing of the output light.

2. The detection apparatus according to claim 1, wherein the reflecting detection surface isbeing arranged for binding the particles to be detected.

3. The detection apparatus according to claim 2, wherein the reflecting detection surface is arranged at the target side of the separation path.

4. The detection apparatus according to claim 3, including at least one of the features the distance of the reflecting detection surface from the opening end is selected such that an effect of diffusion dominates an effect of the separation force, the opening end has a tapered shape facing to the reflecting detection surface, and the separation path is arranged such that the opening end thereof is arranged out of a focus of the illumination light source.

5. The detection apparatus according to claim 2, further comprising a gate electrode being arranged on a back side of the reflecting detection surface for creating an electric driving force moving the particles towards the reflecting detection surface.

6. The detection apparatus according to claim 5, wherein the gate electrode is coupled with an AC voltage source.

7. The detection apparatus according to claim 1, wherein the illumination light source is arranged for illuminating the reflecting detection surface with illumination light, and the imaging optics and the sensor camera are arranged for collecting a series of interferometric images of the illuminated reflecting detection surface each comprising a superposition of a background reference portion of the illumination light being reflected or transmitted at the reflecting detection surface and a scattered portion of the illumination light created by the particles.

8. The detection apparatus according to claim 1, wherein the analyzing unit including the computer unit is configured for subjecting the scattering light signals to at least one of a background subtraction procedure, a background interpolation procedure, a dynamical filtering procedure, and correlation-based extraction of modulated background.

9. The detection apparatus according to claim 2, wherein the separation force generator includes a source side electrode and a target side electrode being configured for creating the separation force, and the target side electrode comprises one of; a) a transparent electrode arranged on the reflecting detection surface, b) an electrode coating surrounding the reflecting detection surface, and c) a free standing electrode arranged above the reflecting detection surface.

10. The detection apparatus according to claim 1, wherein the detection device and the separation force generator are arranged such that the particles move through the detection volume.

11. The detection apparatus according to claim 10, wherein the detection volume is a section of the separation path.

12. The detection apparatus according to claim 10, wherein the separation force generator includes two electrodes connected to a separation voltage source that modulates a separation voltage for a modulation of the separation force.

13. The detection apparatus according to claim 10, wherein the illumination light source is arranged for illuminating the detection volume with illumination light, and the imaging optics and the sensor camera are arranged for collecting a series of interferometric images of the illuminated detection volume comprising a superposition of a background reference portion of the illumination light being reflected at or transmitted through the detection volume and a scattered portion of the illumination light created in the detection volume by the particles.

14. The detection apparatus according to claim 10, wherein the illumination light source is arranged for illuminating at least one focus position in the detection volume with illumination light, and the imaging optics and the sensor camera are arranged for collecting interferometric light signals at the at least one focus position comprising a superposition of a background reference portion of the illumination light being reflected at or transmitted through the detection volume and a scattered portion of the illumination light created by the particles at the at least one focus position.

15. The detection apparatus according to claim 14, wherein the illumination light source is arranged for illuminating at least two focus positions in the detection volume with illumination light, the imaging optics and the sensor camera are arranged for collecting the interferometric light signals at the at least two focus positions, and the analyzing unit is configured for subjecting the interferometric light signals to a correlation analysis.

16. The detection apparatus according to claim 1, wherein the separation force generator is configured for creating at least one of an electric force, an isoelectric focusing force, a flow force, a magnetic force, a mechanical force and an optical force.

17. The detection apparatus according to claim 1, wherein the separation path comprises one of an electrophoresis separation path, a chromatography separation path and a pH gradient configured for isoelectric focusing.

18. The detection apparatus according to claim 1, wherein the separation force created by the separation force generator individually separates the particles from each other along the separation path by separating the particles of one particle type from particles of at least one of another particle type and remaining components of the sample substance, arrival times are determined by different particle velocities along the separation path, And the detection device is configured for detecting the individually separated particles in the detection volume as a series of single light scattering events, each of the single light scattering events being created by one of the individually separated particles in the detection volume, and interferometric sensing of the series of single scattering events is created by collecting scattering light signals from the individually separated particles.

19. The detection apparatus according to claim 2, wherein the reflecting detection surface is arranged at the target side of the separation path, and the particles to be detected are bound to the reflecting detection surface by effect of one of a particle charge and specific or non-specific physical or chemical interaction.

* * * * *